United States Patent [19]

Endoh et al.

[11] Patent Number: 4,633,326
[45] Date of Patent: Dec. 30, 1986

[54] FASCIMILE COMMUNICATION SYSTEM WITH DESIRED IMAGE QUALITY

[75] Inventors: Toshiaki Endoh, Tanashi; Yasuhiro Yamazaki, Hiratsuka, both of Japan

[73] Assignee: Kokusai Denshin Denwa Kabushiki Kaisha, Tokyo, Japan

[21] Appl. No.: 658,187

[22] Filed: Oct. 5, 1984

[30] Foreign Application Priority Data

Oct. 6, 1983 [JP] Japan .................. 58-185907

[51] Int. Cl.$^4$ ................... H04N 1/40; H04N 1/00
[52] U.S. Cl. ..................... 358/280; 358/256; 358/260; 382/56
[58] Field of Search ............... 358/256, 257, 260, 280, 358/283, 282, 286; 382/56

[56] References Cited

U.S. PATENT DOCUMENTS 4,153,916  5/1979  Miwa et al. ............... 358/257
4,517,606  5/1985  Yokomizo et al. .......... 358/280

Primary Examiner—Howard W. Britton
Assistant Examiner—John K. Peng
Attorney, Agent, or Firm—Robert E. Burns; Emmanuel J. Lobato; Bruce L. Adams

[57] ABSTRACT

A facsimile communication system, in which a coding level of a facsimile signal is determined for each image to be transmitted by a coding algorithm of an encoder in correspondence to an image quality of a receiving image sent from the receiving side of the facsimile signal, so that the above-mentioned each image is encoded in the encoder by the use of the coding level and then transmitted to the receiving side.

4 Claims, 5 Drawing Figures

FASCIMILE COMMUNICATION SYSTEM WITH DESIRED IMAGE QUALITY

BACKGROUND OF THE INVENTION

The present invention relates to facsimile communication and, more particularly, to facsimile communication where image information is coded and transmitted so as to satisfy predetermined image quality.

Conventional facsimile communication, in particular, facsimile signal coding techniques, have pursued a subject as to how faithfully and fast an original picture can be transmitted.

On the other hand, facsimile communication has been diversified in recent years, and some of them do not always demand high resolution. That is, resolution is needed to be high enough only to recognize the contents of received image at the receiving side. For example, in case of transmitting very complex images or fine characters, high resolution is required if it is necessary to keep the quality of the received image high to a certain extent, but in case of transmitting simple images or large characters, high resolution is not always needed if it is necessary only to guarantee the same-grade image quality for the received images.

Heretofore, there have been established, from the abovesaid technical viewpoint, techniques by which the sender selects resolution in accordance with the property of the image to be transmitted. However, the prior art does not guarantee the image quality of the received image. Moreover, it does not fully satisfy the receiver's requirements and cannot be applied to the retrieval of the data base and so forth.

Further, facsimile communication has been effectively utilized for soft copy image communication as in the retrieval of an image data base as well as for conventional hard copy image communication. In the soft copy image communication, the method is useful, where a crude version of the image is transmitted and displayed quickly to recognize the contents of it as soon as possible, and the supplementary image information, if necessary, is added gradually to improve the image quality in order to reduce the transmission cost.

SUMMARY OF THE INVENTION

In view of the technical background described above, it is an object of the present invention to provide a facsimile communication system which assures provision of desired image quality at the receiving side without transmitting thereto unnecessary information.

In accordance with the present invention, there is provided a facsimile communication system, in which a coding level of a facsimile signal is determined for each image to be transmitted by a coding algorithm of an encoder in correspondence to an image quality of a receiving image sent from the receiving side of the facsimile signal, so that the above-mentioned each image is encoded in the encoder by the use of the coding level and then transmitted to the receiving side.

BRIEF DESCRIPTION OF THE DRAWINGS

The present invention will be described in detail below with reference to the accompanying drawings, in which.

DETAILED DESCRIPTION OF THE PREFERRED EMBODIMENTS

Figure 1:
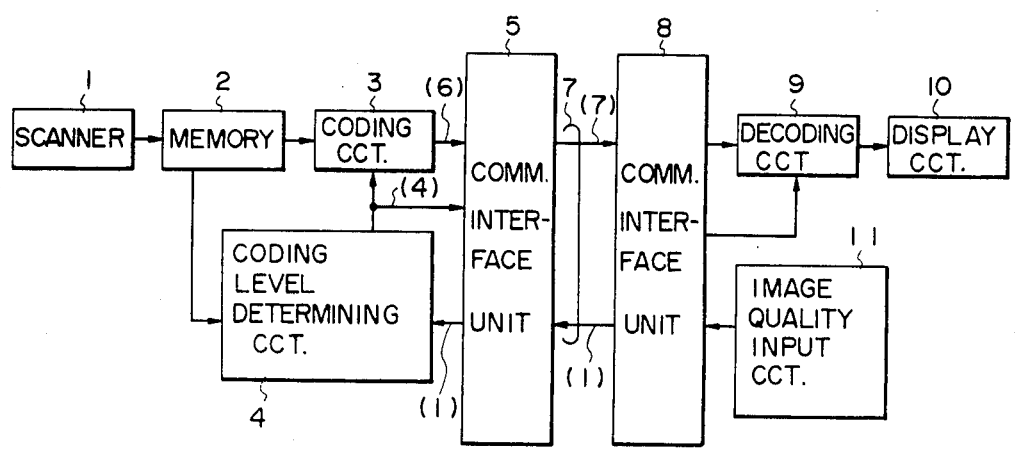
FIG. 1 is a block diagram illustrating an embodiment of the present invention.

With reference to FIG. 1, an embodiment of the present invention designed for soft copy communication will be described. In FIG. 1, reference numeral 1 indicates a scanner; 2 designates a memory for storing high-resolution image signals of one frame read out by the scanner 1; 3 identifies an image signal coding circuit; 4 denotes a coding level determining circuit for determining, for each image, a block of picture elements or a block of scanning lines in one frame a coding level (described later) in accordance with an image quality signal (1) (e.g. the error rate of picture elements) sent timely from the receiving side; 5 represents a communication interface unit at the transmitting side which transmits the output (6) of the coding circuit 3 and the output (4) of the coding level determining circuit 4 to the receiving side and, at the same time, receives signals (1) from the receiving side and takes charge of protocol which is a communication rule between the transmitting side and the receiving side; 7 shows a full duplex or half duplex transmission path; 8 refers to a communication interface unit of the receiving side; 9 indicates a decoding circuit comprising a memory for storing the received image signal of one frame; 10 designates an image display circuit for timely displaying a received image decoded by the decoding circuit 9; and 11 identifies an image quality input circuit for selectively transmitting a desired image quality signal to the transmitting side in order to select the image quality in view of the displayed image on the screen of the image display.

It will be appreciated from FIG. 1 that the feature of the present invention resides in the additional provision of the memory 2 and the coding level determining circuit 4, at the transmitting side, and the image quality input circuit 11, at the receiving side for providing the image quality signal (1) applied to the coding level determining circuit 4 in the prior art facsimile communication system. Accordingly, the operation of this embodiment will be described mainly in connection with the coding level determining circuit 4 which is the principal part of the present invention.

The coding level corresponds to the resolution in conventional MR (Modified Read) and MH (Modified Huffman) systems, and indicates to what stage of a signal is to be coded.

Figure 2:
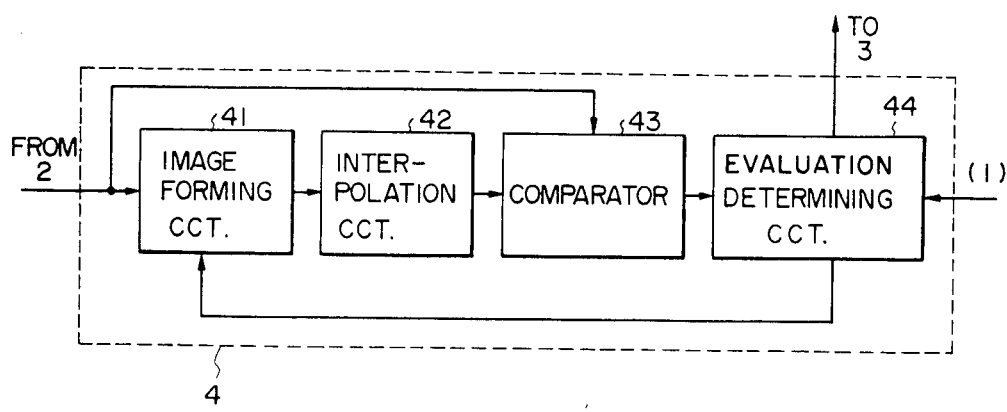
FIG. 2 is a block diagram showing an example of a coding level determining circuit for use in the embodiment of FIG. 1.

The coding level determining circuit 4 comprises an image forming circuit 41, an interpolation circuit 42, a comparison circuit 43 and an evaluation determining circuit 44, as shown in FIG. 2. The image forming circuit 41 comprising a coder and a recoder and reads out picture elements from the memory 2 in units of picture elements or on a line-wise basis and produces an image to be obtained on the receiving side. That is, the image which is to be obtained when the coded picture elements are decoded by the decoding circuit 9 at the receiving side is coded by the coding algorithm of the coding circuit 3. The interpolation circuit 42 normally interpolates the output of the image forming circuit 41 by the same algorithm as the interpolation algorithm by which the decoding circuit 9 at the receiving side interpolates uncoded (untransmitted) picture elements or lines on the basis of received picture elements or lines through interpolating calculation or replacement. Thus, the image to be obtained at the receiving side is produced. The comparison circuit 43 compares the image derived at the output of the interpolation circuit 42 with the original image stored in the memory 2 in units of picture elements or on a line-wise basis. The evaluation determining circuit 44 evaluates the result of comparison by the comparison circuit 43 on the basis of the image quality signal (1) transmitted from the receiving side. When the result of comparison lies within a given limit range, the evaluation determining circuit 44 decides that the current coding level is optimal, and instructs the coding circuit 3 to perform coding at the current coding level. When evaluating that the result of comparison by the comparison circuit 43 is outside the permissible range, the evaluation determining circuit 44 instructs the image forming circuit 41 to change the coding level so as to raise the scanning-line frequency and to repeat the above-described operations, so that large characters and small characters on an original image can be received at the same-grade image quality.

Now, a description will be given of the relationship between the coding algorithm of the coding circuit 3 and the image quality evaluation algorithm of the evaluation determining circuit 44.

Any coding schemes can be applied to the coding circuit 3, it is no exaggeration to say that no matter which coding scheme is employed, the interpolation algorithm determines the quality of a received image at a certain coding level. For example, according to the MR or MH coding scheme, the transmitting side codes and transmits interlaced picture elements for several lines, and the receiving side interpolates skipped-over lines. Accordingly, each of the thus coded and transmitted picture elements is free from any error except a transmission error, but the situation sometimes arises where a white picture element in the original picture is interpolated by a black picture element or where a black picture element in the original picture is interpolated by a white picture element. For such a coding scheme, it is sufficient only to count the number of erroneous picture elements detected by the comparison circuit 43 and to change the coding level, i.e. the line density (the scanning line frequency), so that the counted value is smaller than the number of erroneous picture elements (within a given limit range) corresponding to the picture quality desired by the receiving side.

Further, as a coding algorithm, there has been proposed a progressive coding scheme according to which picture elements are sequentially coded for transmission in the order of the degree of improvement on the image quality (see Proceedings S3-10 of '82 National Conference of Communications Department, Institute of Electronics and Communication Engineers of Japan). According to this scheme, picture elements are coded at intervals of several lines first and then the remaining lines are coded using eleven coding levels at maximum, in the order of the degree of improvement on the quality, by referring to information of already coded lines before and after each line to be coded; this technique is effective for the soft copy image communication as well as for the hard copy image communication. This coding scheme is common, in the utilization of the degree of improvement on the image quality, to the present invention which determines the coding level on the basis of image quality, and it is considered that the above coding scheme is most effective for the application to the present invention.

Figure 3:
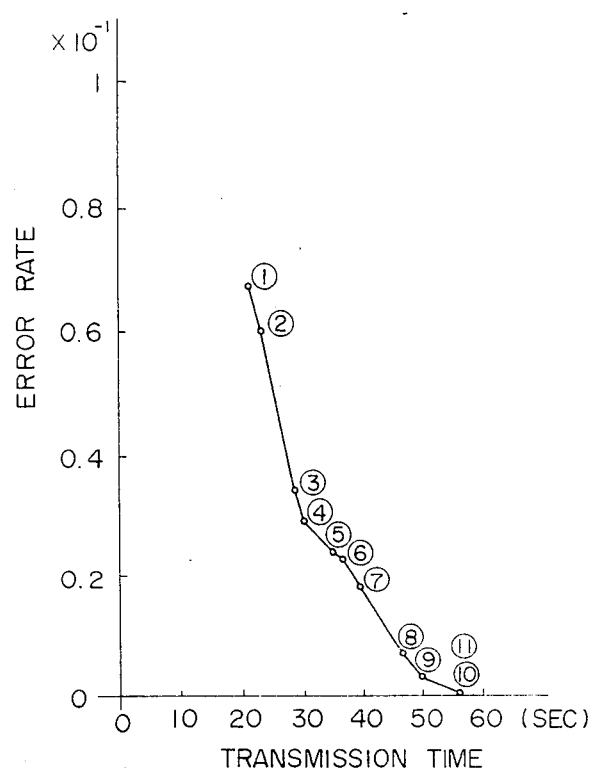
FIG. 3 is a graph showing characteristics for determining the basis on which the coding level is determined in the present invention.

In case of employing this coding scheme, the coding level can be determined by using the relationships between the erroneous picture element rate and the coding level, as shown in FIG. 3. FIG. 3 shows the relationships between the transmission time and the erroneous picture element rate in the case of a transmission rate being 9600 bps and a test document CCITT No. 4, and numerals on the curve indicate coding levels.

As another method for evaluating the image quality, it is also possible to employ a cross-correlation function g (m, n) of picture elements. The cross-correlation function g (m, n) is given by the following equation:

$$g(m, n) = \frac{\int\int f_{11}(r) \cdot f_{mn}(r) dr}{\sqrt{\int\int f_{11}(r) \cdot f_{11}(r) dr} \cdot \sqrt{\int\int f_{mn}(r) \cdot f_{mn}(r) dr}} \quad (1)$$

where $f_{11}(r)$ is an original image and $f_{mn}(r)$ is such an image that an image obtained by compressing the original image by $1/m$ in a horizontal direction and by $1/n$ in a vertical direction ($m \times n$ picture elements being represented by one picture element) was simply enlarged m times in the horizontal direction and n times in the vertical direction for comparison with the original image.

Figure 4:
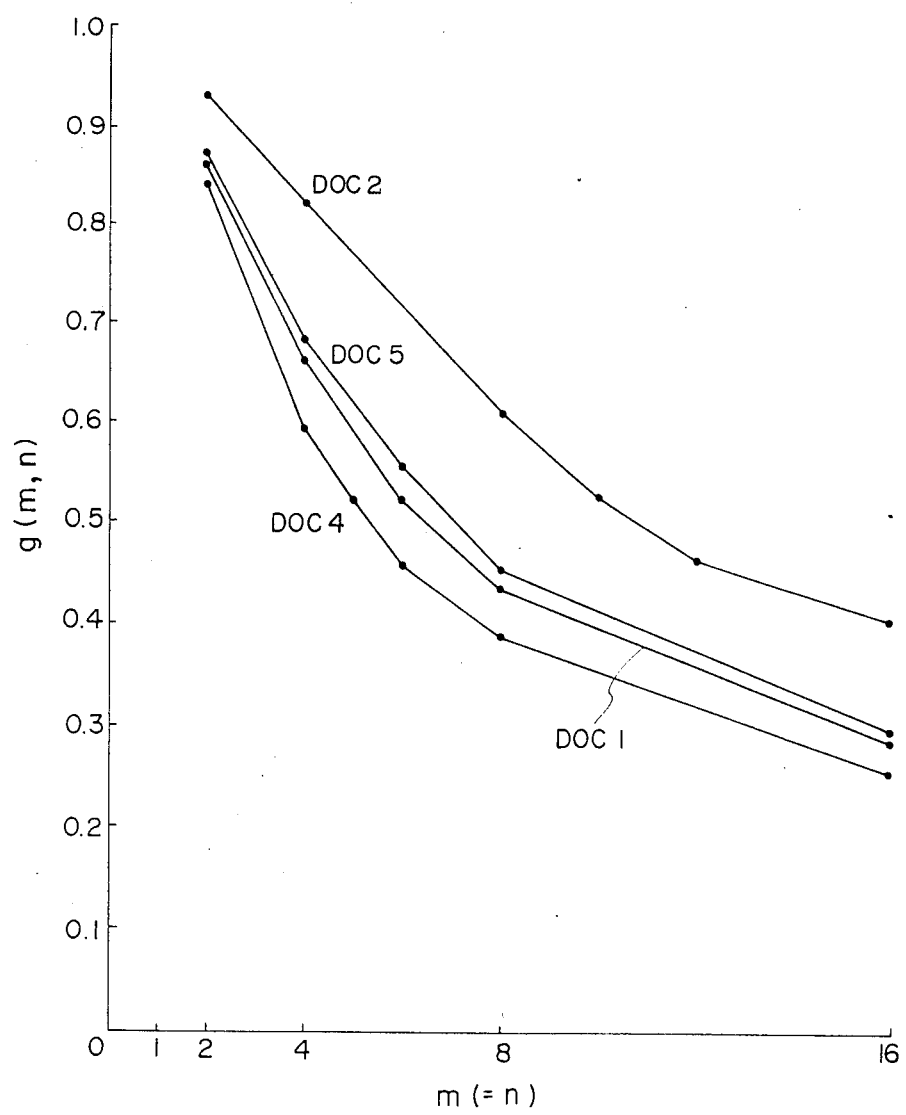
FIG. 4 is a graph showing an example of the evaluation of image quality in the present invention.

FIG. 4 shows the relationship between the cross-correlation function g (m, n) and the magnification m (=n), using CCITT test chart documents 1, 2, 4 and 5. As will be appreciated from the relationship shown, the less the quality of the image $f_{mn}(r)$ is degenerated as compared with the original picture, the more the value of the cross-correlation function g (m, n) increases; therefore, the cross-correlation function g (m, n) can be utilized as one means for the evaluation of picture quality.

Figure 5:
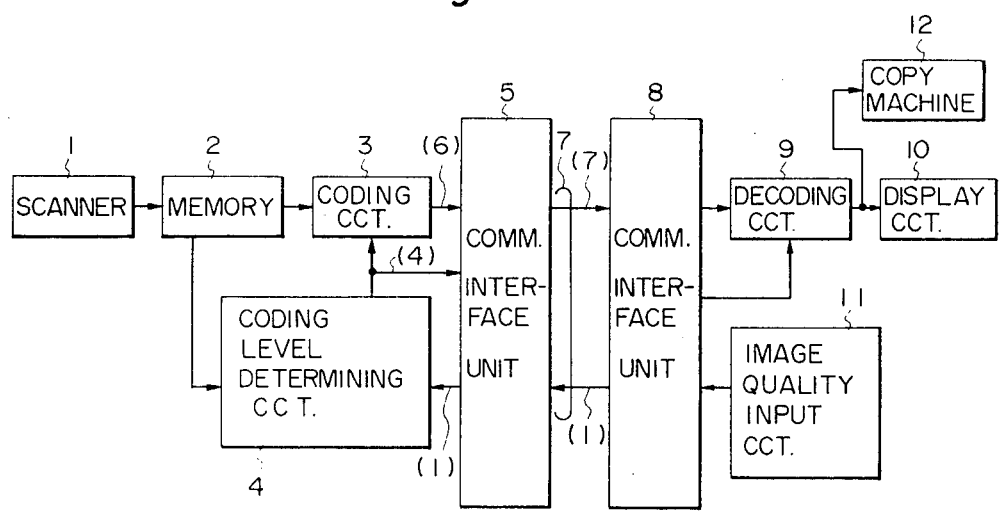
FIG. 5 is a block diagram illustrating another embodiment of the present invention.

While the above embodiment of the present invention has been described in connection with soft copy image communication, the present invention can be applied to hard copy image communication or hard-soft asiciated image communication, as shown in FIG. 5. In this case, a hard copy machine 12 can provide hard copies of the received images displayed on the screen of the image display 10.

As has been described above in detail, according to the present invention, since the coding level is determined on the basis of the image quality, it is possible to obtain desired quality for a received image and to reduce transmission of unnecessary information and hence improve the transmission efficiency as well. Accordingly, the present invention is of particular utility when employed not only for hard copy communication but also for communication systems which don't handle evaluation of image quality on the transmitting side, such as a picture data base.

What we claim is:
1. A facsimile communication system connected to a transmission path comprising:
 memory means for temporarily storing image signals to be transmitted;
 interface means coupled to the transmission path for transmitting a coded image signal to the transmission path and for receiving an image quality signal from a receiving side of the transmission path;

coding level determining means coupled to the memory means and the interface means for determining a coding level in correspondence to said image quality signal in accordance with a predetermined coding algorithm for each image readout from the memory means to be transmitted; and encode means coupled to said memory means, said coding level determining means and said interface means for encoding said each image by the use of the coding level to provide said coded image signal, which is transmitted to said transmission path through said interface means.

2. A facsimile communication system according to claim 1, in which said image quality signal is indicative of the error rate of the transmitted picture elements of said image signals.

3. A facsimile communication system connected to a transmission path comprising:

memory means for temporarily storing image signals to be transmitted;

interface means coupled to the transmission path for receiving an image quality signal from a receiving side of the transmission path;

coding level determining means coupled to the memory means and the interface means for determining a coding level in correspondence to said image quality signal in accordance with a predetermined coding algorithm for each image readout from the memory means to be transmitted;

encode means coupled to said memory means, said coding level determining means and said interface means for encoding said each image by the use of the coding level to provide said coded image signal, which is transmitted to said transmission path through said interface means, and said image quality signal is indicative of the cross-correlation function of the transmitted picture elements.

4. A facsimile communication system connected to a transmission path comprising:

memory means for temporarily storing image signals to be transmitted;

interface means coupled to the transmission path for receiving an image quality signal from a receiving side of the transmission path;

coding level determining means coupled to the memory means and the interface means for determining a coding level in correspondence to said image quality signal in accordance with a predetermined coding algorithm for each image readout from the memory means to be transmitted;

encode means coupled to said memory means, said coding level determining means and said interface means for encoding said each image by the use of the coding level to provide said coded image signal, which is transmitted to said transmission path through said interface means, and said coding level determining means produces the coding level so that a difference between said original each image signal and an image to be obtained with reference to said image quality signal is included in a permissible range.

* * * * *